June 18, 1940.  W. G. ROSE  2,205,125
POISON HOLDER FOR RODENTS
Filed Feb. 28, 1938

INVENTOR.
WILLIAM G. ROSE.
BY Allen & Allen
ATTORNEYS.

Patented June 18, 1940

2,205,125

UNITED STATES PATENT OFFICE 2,205,125

POISON HOLDER FOR RODENTS

William G. Rose, Springfield Township, Hamilton County, Ohio

Application February 28, 1938, Serial No. 193,010

3 Claims. (Cl. 43—131)

My invention relates to poison holders for rodents particularly in connection with the protection of trees and other growing vegetation which rodents destroy.

The object of my invention is to provide a simple and efficient means for destroying rodents and other small animals, particularly of the type which in some parts of the country are found to be destructive of crops and which particularly have been found to be destructive of growing trees. The rodents bore down under the ground and chew off all the soft bark of the trees below the surface of the ground, so that their presence in this destructive work is unnoted until many months afterward the tree shows obvious signs of dying.

It is further an object of my invention to provide a poison holder which rodents and small animals frequent because of the mechanical construction of the holder which permits a runway and tunnel to be provided through which the rodents will run, and in combination with which rodents will burrow tunnels through the grass and clods of earth, to incorporate the poison holder in the passages and tunnels which they frequent, so that the exposure to the rodents of the poison will occur during the destructive activity of the rodents on the tree roots.

It is my object to provide a poison holder which can be conveniently filled and which will be unavailable to poultry, cattle, dogs, horses and game and song birds, and which will thus only be accessible to the objectionable and destructive rodents which it is my desire to exterminate in the interests of conservation of crops and orchards.

It is further my object to provide a poison holder which will receive the particular kind of poison grain which the Department of Agriculture recommends for rodent extermination.

As an added improvement to the general scope of my invention, I provide a movable cover for the poison holder which can be readily reached so that children playing in the vicinity of the poison holders will not be likely to so manipulate the holder that the poison grain will be available to birds, chickens and such other farm animals which may be free to walk about in the vicinity of the poison holders.

It is a still further object of my invention to provide a poison holder which can be readily anchored in the ground in a desirable position and in which the actual receptacle for the poison will be held in position, spaced from the ground so that the poison will not be diluted by admixture with moisture from rain or snow.

The above objects and other objects to which reference will be made in the ensuing description, I accomplish by that certain construction and arrangement of parts of which I shall now describe a preferred embodiment.

Referring to the drawing.

Figure 1:
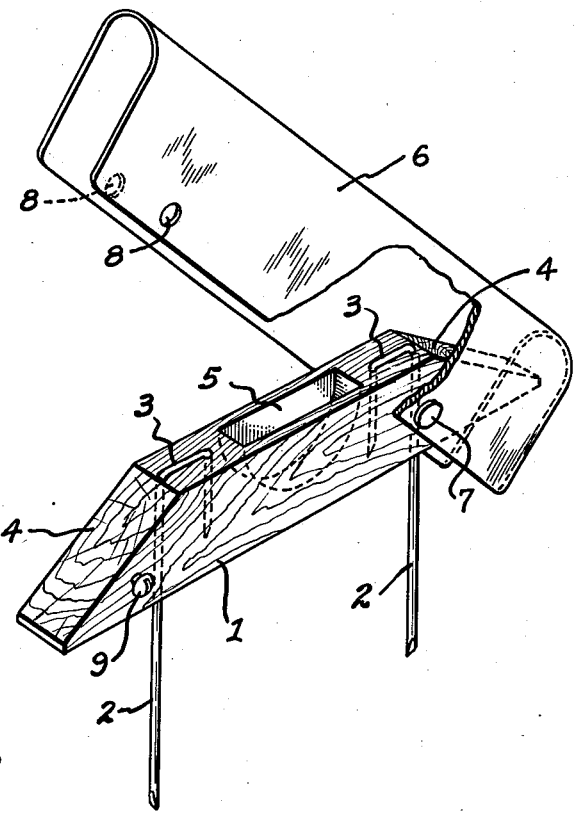
Figure 1 is a perspective view of the poison holder with the cover partly opened.

The poison holder has a base member generally indicated at 1, and which is preferably formed from a wooden block the wood of which is treated so as to render it weatherproof. While the material of which my holder is made is not essential it will be readily understood that the device may be manufactured of some moulding composition such as Bakelite, an asphaltic composition and the like.

As a simple method of securing the base of the holder in the ground, I have shown wires which preferably have pointed ends which are forced into the ground, the wires being passed through holes in the base and then clamped over as at 3.

I find that the shape of the base is of importance and it will be observed that the base has inclined runways 4 at each end. These runways provide entrances to the tunnel formed over the poison receptacle which is preferably positioned in a well 5 at the center of the base. The cover generally indicated at 6 is of U-shape formation and may be conveniently pivoted as indicated at 7 on a metal pin which is driven through the base.

At the end opposite the pivot point the cover may be provided with openings 8 which when the cover is set down in position on the holder registers with the heads 9 of screws which are secured in the side walls of the base. By inward pressure against the sides of the cover the heads of the screws will pass through the holes 8. Then with a slight upward movement of the end of the cover opposite the pivot point the screw heads will be interlocked with the sides of the cover so that a straight upward pull will not result in elevating the cover. In order to open up the cover, the cover is first depressed slightly and pressure is exerted outwardly against the side walls of the cover so that the interlock with the heads of the screws will be released.

Other types of attachments may be employed for securing the pivoted cover in position on the base, and I have merely described one very simple method for interlocking the cover with the base so that the likelihood of the cover becoming displaced becomes quite remote.

Observing the poison holder from the end, it will be noted that a tunnel 10 is provided which forms an attractive entrance for a rodent in the course of the rodent's travels in search of food.

I have found that in an orchard where I have planted poison holders such as those described herein, rodents will build tunnels to the tunnels leading to the poison holders so that in their course of scampering about they will be repeatedly exposed to the poison grain.

Figure 4:
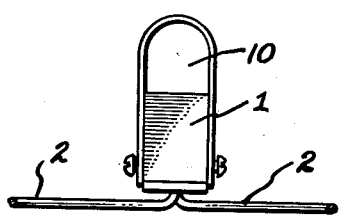
Figure 4 is an end elevation of the poison holder with the barbs for insertion into the ground bent out at right angles for convenience in shipping and also for providing legs on which the holder may be supported on a flat surface.
Figure 3:
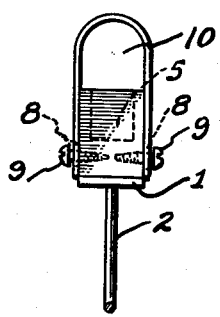
Figure 3 is an end elevation of the poison holder.
Figure 2:
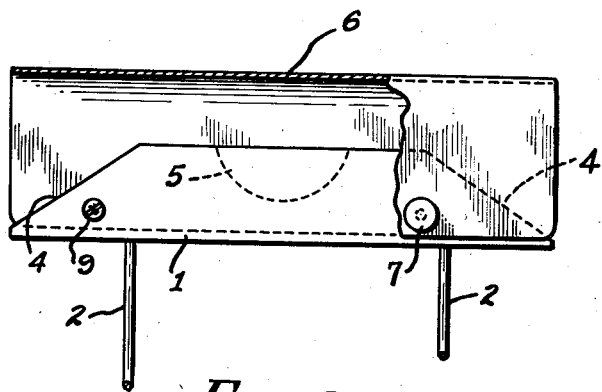
Figure 2 is a side elevation of the poison holder with parts in section.

In Fig. 4 I have illustrated the poison holder with the wires 2 bent back at a right angle to the bottom surface of the holder 1 which in some instances will be convenient for packaging the holders for shipment, and also for providing legs on which the holder may be supported on a flat surface. It will further be understood that the wires may be bent into an open relapping relation parallel with the bottom surface of the holder 1 for convenience in shipping.

In the pest control pamphlet of the agricultural extension service of the Ohio State University, Bulletin No. 128 revised February, 1934, the following directions are given with respect to the positioning of poison bait holders:

"Removing all weeds and grass from the area around the tree trunk in the fall is always advisable to guard against mouse injury. However, when mice are abundant, the use of poisoned baits is the only dependable method to use.

"*Poison stations.*—The bait should be placed in poison stations which are set close to the base of the tree and lightly covered with vegetation or prunings. If mice are abundant, place one station under each tree. The stations should be on high ground to avoid standing water. These are preferably made of wood and may consist of pieces of board and lath nailed together to make a small mouse runway and also shelter the bait.

"Drain tiles of 1½ inches diameter or larger, or hollow building tile serve fairly well. Wide mouth glass jars have been used successfully. The stations should be refilled with bait as required. Baiting should be done late in the fall and again during the winter or early spring if necessary.

"*Two good formulas.*—The following formulas for preparing mouse bait are recommended by the Bureau of Biological Survey, United States Department of Agriculture:

"*Rolled-oat bait.*—Mix together dry, ⅛ ounce of powdered strychnine and ⅛ ounce of baking soda. Sift the strychnine-soda mixture over 1 quart of rolled oats, stirring constantly to insure an even distribution of the poison through the grain. Thoroughly warm the poisoned rolled oats in an oven and sprinkle over them 6 tablespoonfuls of a mixture of 3 parts of melted beef fat and 1 part of melted paraffin, mixing until the oats are evenly coated. When the grain is cool it is ready for use.

"A teaspoonful of the bait should be placed in each poison station. This poison may also be placed inside entrances of burrows. It should not be scattered in the open where birds will feed upon it.

"*Starch-coated grain bait.*—Mix 1 tablespoonful of gloss starch in ½ teacup of cold water and stir into ¾ pint of boiling water to make a thin clear paste. Mix 1 ounce of powdered strychnine with 1 ounce of baking soda and stir into the starch to a smooth creamy mass free of lumps. Stir in ¼ pint of heavy corn sirup and 1 tablespoonful of glycerine. Apply to 12 quarts of wheat or to 20 quarts of steam-crushed whole oats and mix thoroughly to coat each kernel.

"Steam-crushed whole oats are preferable as they may be scattered in the open without endangering bird life. This bait is prepared each summer at the Idaho field station of the U. S. Biological Survey and shipped at cost to local farm organizations, which send in their orders. For information about this, growers should consult their county agent, or state agricultural college."

It will be observed that it is recommended that the stations be on high ground to avoid standing water and that the stations are preferably made of wood consisting of pieces of board and lath nailed together to make a small mouse runway and also shelter the bait.

My invention is particularly adaptable for providing a convenient receptacle which may be inexpensively purchased by farmers and which will be found most effective in retaining the poison bait for long periods without deterioration. Ordinarily one poison holder will suffice for each tree if the poison holder is placed in a position of convenient access to the roots of the tree.

I am familiar with the metal poison holders illustrated and described in the Mann Patent 890,430, in the Hedrich et al. Reissue Patent No. 14,782 and in the Greenway Patent No. 1,471,954, but I find a metallic poison holder has disadvantages because of changes in temperature in metal, condensation causes moisture which soon causes molding and deterioration in the bait. I find it preferable to have the actual receptacle for receiving the poison bait in a non-metallic compartment such as is illustrated at 5 in Figure 1 of the drawing.

If it is desired to fill the holder prior to inserting it in the ground, the holder may be passed through a bucket of poison grain with the holder held in the hand in inverted position. After the cover has received a certain amount of the poison bait the holder is then reversed in position during which movement the receptacle will be filled and the rest of the poison bait will slide down the runway and back into the bucket. The holders after being filled may then be set into the ground in desirable positions.

Having thus described my invention, what I claim as new and desire to secure by Letters Patent is:

1. A poison holder for rodents comprising a non-metallic base having upwardly inclined runways at the ends thereof, a substantially flat medial portion having a recess formed therein providing a receptacle for receiving poisoned bait, and a movable cover forming a tunnel over the base through which rodents will pass into proximity with the poisoned bait receptacle.

2. A poison holder for rodents comprising a wooden base having upwardly inclined runways at the ends thereof and a substantially flat portion intermediate the runways having a recessed well formed therein adapted to act as a receptacle for poisoned bait, and a movable cover formed as an arch fitting down over the sides of the base and forming a tunnel extending in proximity to the poisoned bait receptacle, and said cover being hinged at one end to the base.

3. A poison holder for rodents comprising a wooden base having upwardly inclined runways at the ends thereof and a substantially flat portion intermediate the runways having a recessed well formed therein adapted to act as a receptacle for poisoned bait, a movable cover formed as an arch fitting down over the sides of the base and forming a tunnel extending in proximity to the poisoned bait receptacle, and said cover being hinged at one end to the base, and means in the form of wire legs for securing said base in position on the ground, said legs being bendable to provide a laterally extending support for the base.

WILLIAM G. ROSE.